United States Patent
Zhang

(10) Patent No.: US 10,535,920 B2
(45) Date of Patent: Jan. 14, 2020

(54) GPS/BDS VEHICLE ANTENNA WITH DUAL OUTPUT PORT LNA

(71) Applicant: CHANGZHOU CTW ELECTRONICS CO., LTD., Changzhou (CN)

(72) Inventor: Yabin Zhang, Changzhou (CN)

(73) Assignee: CHANGZHOU CTW ELECTRONICS CO., LTD., Changzhou (CN)

( * ) Notice: Subject to any disclaimer, the term of this patent is extended or adjusted under 35 U.S.C. 154(b) by 251 days.

(21) Appl. No.: 15/744,764

(22) PCT Filed: Nov. 18, 2016

(86) PCT No.: PCT/CN2016/106339
§ 371 (c)(1),
(2) Date: Jan. 13, 2018

(87) PCT Pub. No.: WO2018/000697
PCT Pub. Date: Jan. 4, 2018

(65) Prior Publication Data
US 2018/0212320 A1    Jul. 26, 2018

(30) Foreign Application Priority Data

Jun. 29, 2016 (CN) .......................... 2016 1 0530615

(51) Int. Cl.
| | |
|---|---|
| *H01Q 1/50* | (2006.01) |
| *H01Q 23/00* | (2006.01) |
| *H01Q 1/32* | (2006.01) |
| *H04B 1/06* | (2006.01) |
| *H04B 1/18* | (2006.01) |

(52) U.S. Cl.
CPC ............. *H01Q 1/50* (2013.01); *H01Q 1/3275* (2013.01); *H01Q 23/00* (2013.01); *H04B 1/06* (2013.01); *H04B 1/18* (2013.01)

(58) Field of Classification Search
CPC ... H04B 1/06; H04B 1/18; H01Q 1/50; H01Q 1/3275; H01Q 23/00
See application file for complete search history.

(56) References Cited

U.S. PATENT DOCUMENTS 6,332,071 B1 * 12/2001 Brandt ...................... H01P 1/15
333/101
7,171,173 B2 * 1/2007 Zangerl ................... G01S 19/36
342/357.76

* cited by examiner

*Primary Examiner* — Dao L Phan
(74) *Attorney, Agent, or Firm* — CBM Patent Consulting, LLC

(57) ABSTRACT

A GPS/Beidou onboard antenna with a dual output port low noise amplifier includes an antenna, an amplifier chip, a power divider, a first radio frequency switch, a second radio frequency switch, a first direct-current bias, a second direct-current bias, a first port, a second port, and a voltage selection circuit. The antenna transmits a received radio frequency signal amplified by the amplified chip to the power divider connected to the amplified chip; the radio frequency signal is divided by the power divider, in one of which the radio frequency signal goes through the first radio frequency switch, the first direct-current bias and the first port so as to be output to a receiver connected, and in the other of which the radio frequency signal goes through the second radio frequency switch, the second direct-current bias and the second port so as to be output to another receiver connected.

9 Claims, 5 Drawing Sheets

GPS/BDS VEHICLE ANTENNA WITH DUAL OUTPUT PORT LNA

This application is the U.S. national phase of International Application No. PCT/CN2016/106339 filed on 18 Nov. 2016 which designated the U.S. and claims priority to Chinese Application No. CN 201610530615.4 filed on 29 Jun. 2016, the entire contents of each of which are hereby incorporated by reference.

TECHNICAL FIELD

The present disclosure relates to an onboard navigation satellite receiving antenna, and more particularly to a GPS/Beidou onboard antenna with a dual output port low noise amplifier.

BACKGROUND ART

In recent years, with the rapid popularization of onboard navigation and positioning, GPS/Beidou navigation device installed on an automobile has already been widely used. Many automobiles, especially commercial automobiles, may need two navigation devices, one of which is an onboard host for the usual navigation and positioning, the other of which is a remote automobile networking for achieving functions of long-range tracking and positioning of the automobiles. Two GPS/Beidou antennas are thus required accordingly. The current general practice is either to install two GPS/Beidou antennas or to install one antenna in the automobile with a 3 dB power divider connected. However, both of the above two methods have the following problems:
1. A hardware cost may certainly be increased if two antennas are used. In addition, the installation is very inconvenient in case the installation space and location of onboard antenna are limited.
2. Assumed that a 3 dB power divider is used, a 3 dB degradation of the overall system noise may be occurred if the power divider is placed between the amplifier and the antenna; and two paths may be required to work normally at the same time if the power divider is located at an output of the amplifier. If one path is abnormal (open circuit or short circuit), the other path may not work normally, resulting in a very poor overall compatibility of the device.

SUMMARY OF THE DISCLOSURE

In view of the above technical problems, the present disclosure provides a GPS/Beidou onboard antenna with a dual output port low noise amplifier. The antenna adopts dual output ports so that the output of the radio frequency switch automatically switches from the output port to the matching load when one port is in failure. The two ports can be simultaneously powered, and separately powered. The overall performances of the antenna are not thus affected.

A specific technical solution of the present disclosure is as follows:

A GPS/Beidou onboard antenna with a dual output port low noise amplifier, comprising: an antenna, an amplifier chip, a power divider, a first radio frequency switch, a second radio frequency switch, a first direct-current bias, a second direct-current bias, a first port, a second port, and a voltage selection circuit, characterized in that the antenna transmits a received radio frequency signal amplified by the amplified chip, which is connected to the antenna, to the power divider connected to the amplified chip; the radio frequency signal is divided by the power divider to be transmitted in two signal paths, in one of which the radio frequency signal goes through the first radio frequency switch, the first direct-current bias and the first port so as to be output to a receiver connected, and in the other of which the radio frequency signal goes through the second radio frequency switch, the second direct-current bias and the second port so as to be output to another receiver connected; the first radio frequency switch and the second radio frequency switch are each connected to a matching load; the voltage selection circuit, which is connected to the first direct-current bias and to the second direct-current bias, respectively, compares two direct-current voltages from the first port and the second port, and outputs the higher direct-current voltage thereof so as to supply power to the first radio frequency switch, the second radio frequency switch, the power divider and the amplifier chip; the first direct-current bias sends a control signal to connect the first radio frequency switch to the matching load when the first port is open or disconnected; the second direct-current bias sends a control signal to connect the second radio frequency switch to the matching load when the second port is open or disconnected.

In the above solution, the antenna is a microstrip antenna of a ceramic dielectric.

In the above solution, Maxim MAX2670 is used as the amplifier chip.

In the above solution, a Wilkinson microstrip type power divider is used as the power divider.

In the above solution, an Infineon single pole double throw radio frequency switch chip BGS12AL74 is selected for the first radio frequency switch and the second radio frequency switch.

In the above solution, the first direct-current bias and the second direct-current bias consist of an inductor and a capacitor, respectively.

In the above solution, the voltage selection circuit consists of two diodes.

In the above solution, the matching load is a 50 ohm resistor.

In the above solution, the direct-current voltage range is 3 to 6 volts.

The GPS/Beidou onboard antenna with a dual output port low noise amplifier according to the present disclosure has two independent output ports which may work simultaneously or independently. If one port is open or shorted, the other port is not affected and still works normally.

BRIEF DESCRIPTION OF THE DRAWINGS

The present disclosure is further described below with reference to the accompanying drawings and the detailed description of the disclosure.

DETAILED DESCRIPTION OF THE INVENTION

In order to easily understand the technical means, the creative features, the aims and the efficiencies, the present disclosure will be further described with reference to the specific drawings.

Figure 1:
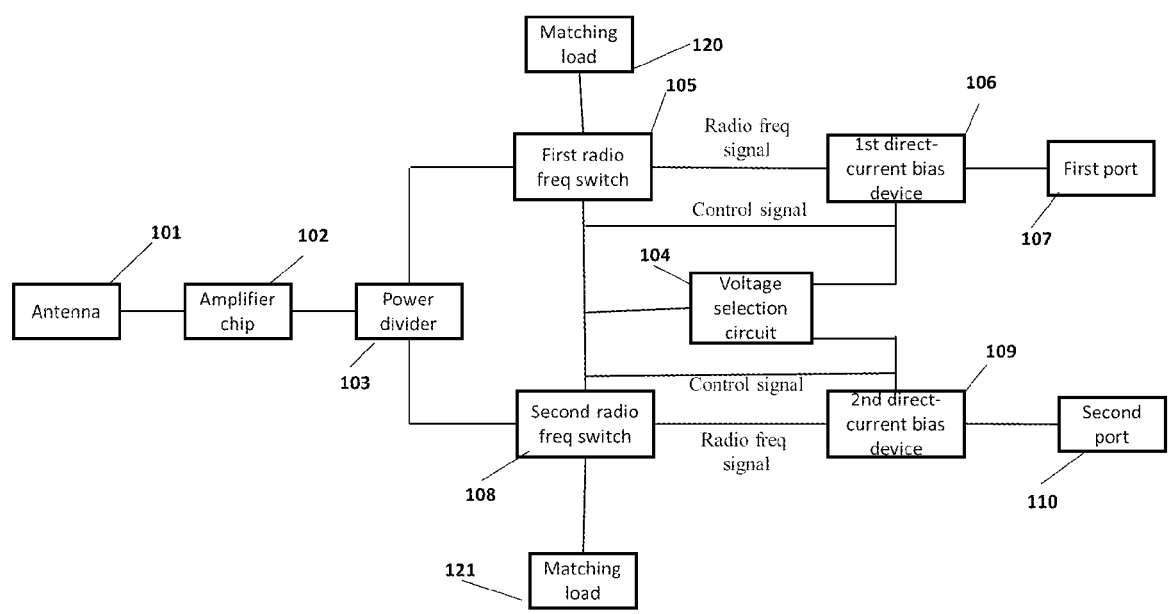
FIG. 1 is a structural block diagram of a GPS/Beidou onboard antenna with a dual output port low noise amplifier according to the present disclosure.

As shown in FIG. 1, a GPS/Beidou onboard antenna with a dual output port low noise amplifier according to the present disclosure includes an antenna 101, an amplifier chip 102, a power divider 103, a first radio frequency switch 105, a second radio frequency switch 108, a first direct-current bias 106, a second direct-current bias 109, a first port 107, a second port 110, and a voltage selection circuit 104.

The antenna 101 transmits a received radio frequency signal amplified by the amplified chip 102, which is connected to the antenna 101, to the power divider 103 connected to the amplified chip 102; the radio frequency signal is divided by the power divider 103 to be transmitted in two signal paths, in one of which the radio frequency signal goes through the first radio frequency switch 105, the first direct-current bias 106 and the first port 107 so as to be output to a receiver connected, and in the other of which the radio frequency signal goes through the second radio frequency switch 108, the second direct-current bias 109 and the second port 110 so as to be output to another receiver connected; the first radio frequency switch 105 and the second radio frequency switch 108 are each connected to a matching load (120; 121).

The voltage selection circuit 104, which is connected to the first direct-current bias 106 and to the second direct-current bias 109, respectively, compares two direct-current voltages from the first port 107 and the second port 110, and outputs the higher direct-current voltage thereof so as to supply power to the first radio frequency switch 105, the second radio frequency switch 108, the power divider 103 and the amplifier chip 102.

The first direct-current bias 106 sends a control signal to connect the first radio frequency switch 105 to the matching load 120 when the first port 107 is open or disconnected; the second direct-current bias 109 sends a control signal to connect the second radio frequency switch 108 to the matching load 121 when the second port 110 is open or disconnected.

Specifically, the antenna is a microstrip antenna of ceramic dielectric, Maxim MAX2670 is used as the amplifier chip, a Wilkinson microstrip type power divider is used as the power divider, an Infineon single pole double throw radio frequency switch chip BGS12AL74 is selected for the radio frequency switches, the voltage selection circuit consists of two diodes, and the direct-current voltage range is 3 to 6 volts.

The direct-current biases consist of an inductor and a capacitor, and the matching load is a 50 ohm resistor.

As a result, when the entire antenna works normally at the two ports, the antenna is supplied by the two ports power simultaneously. The radio frequency signal received by the antenna is amplified by the amplifier chip and then split into two paths of the signal by the power divider. The two paths of the signals separately go through the first radio frequency switch, the second radio frequency switch (at this time, the direct-current bias sends a control signal to the radio frequency switch so as to the output of the radio frequency switch connected with the direct-current bias), the first direct-current bias and the second direct-current bias, finally arrive at the first port and the second port, and then be output to the receiver.

When one port is in failure, e.g., the port is open or shorted, the other port may be powered separately. At this time, the control signal which is sent by the direct-current bias to the radio frequency switch connects the output of the radio frequency switch with the matching load, because the failed port is open or short-circuited. In this way, it may ensure that the other path is not affected and worked normally while the power divider is still in a matching state.

Figure 2:
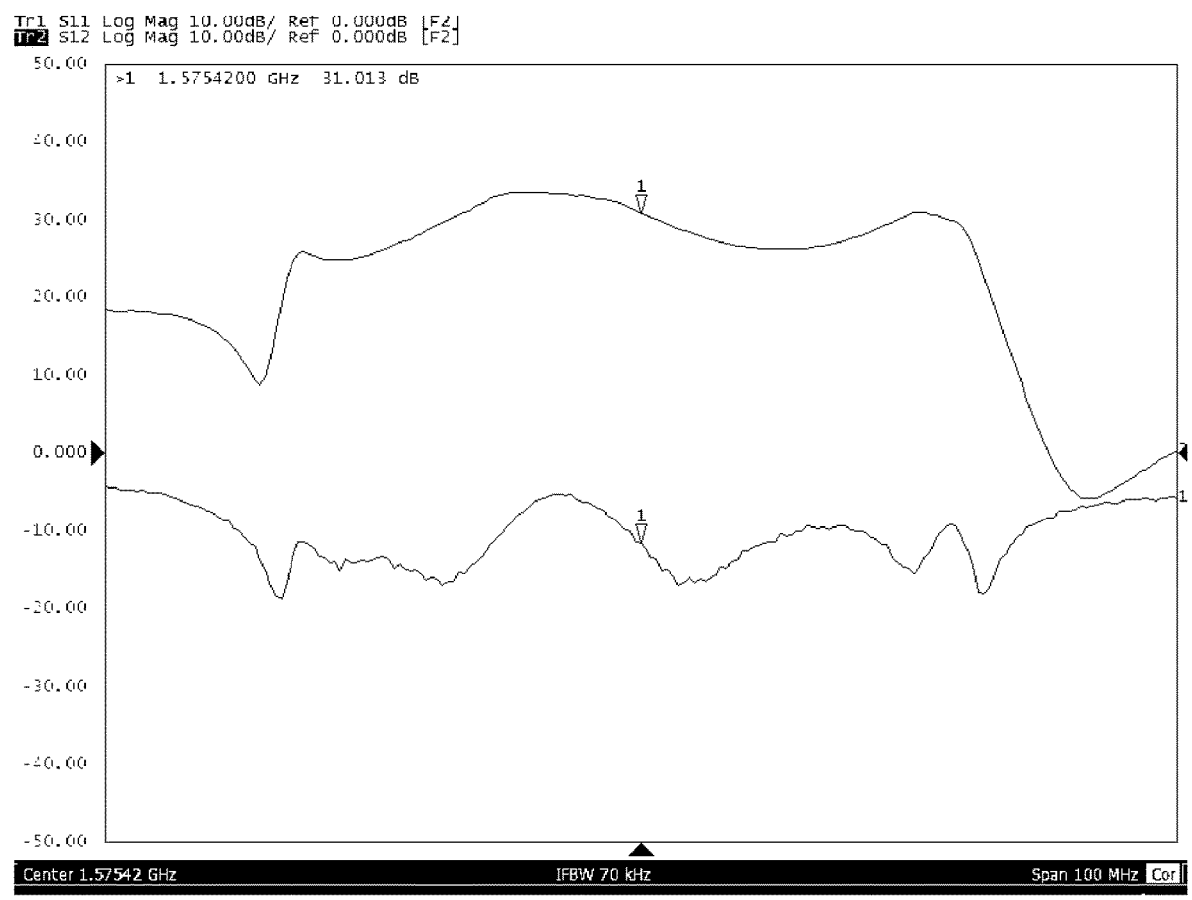
FIG. 2 is a graph of a gain and a return loss of a first port when a second port is open.
Figure 3:
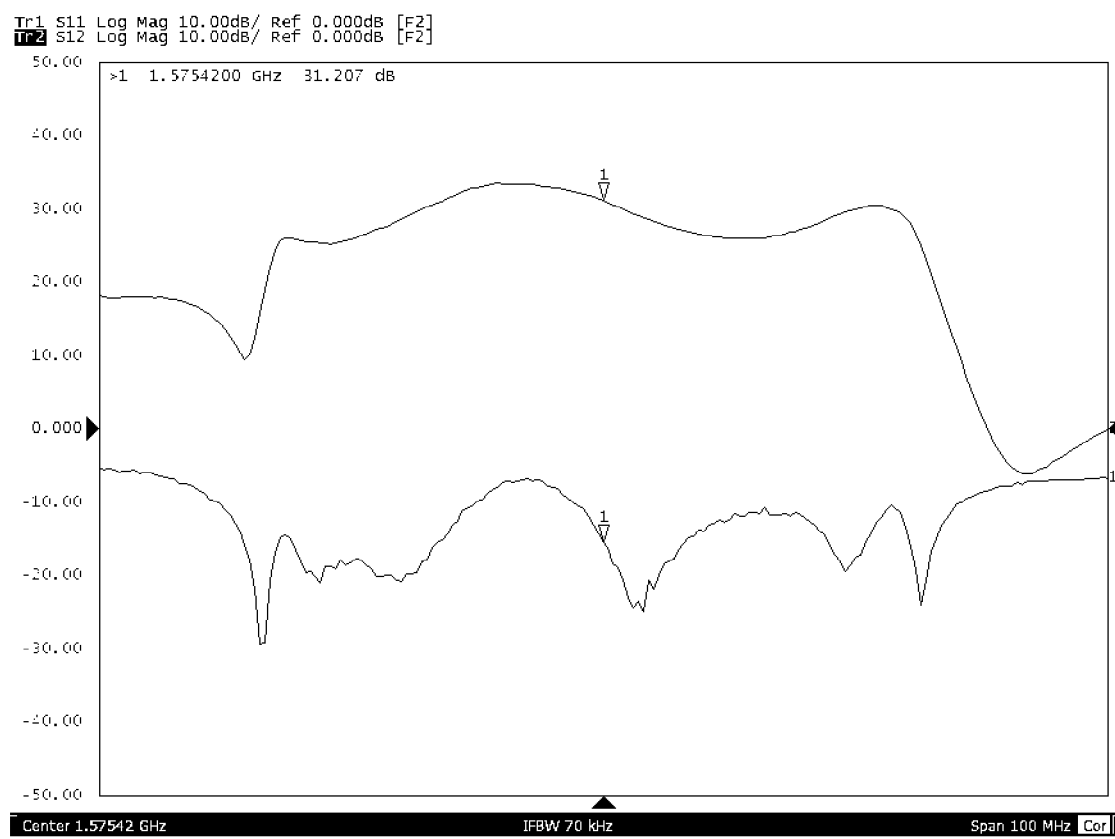
FIG. 3 is a graph of the gain and return loss of the first port when the second port works.
Figure 4:
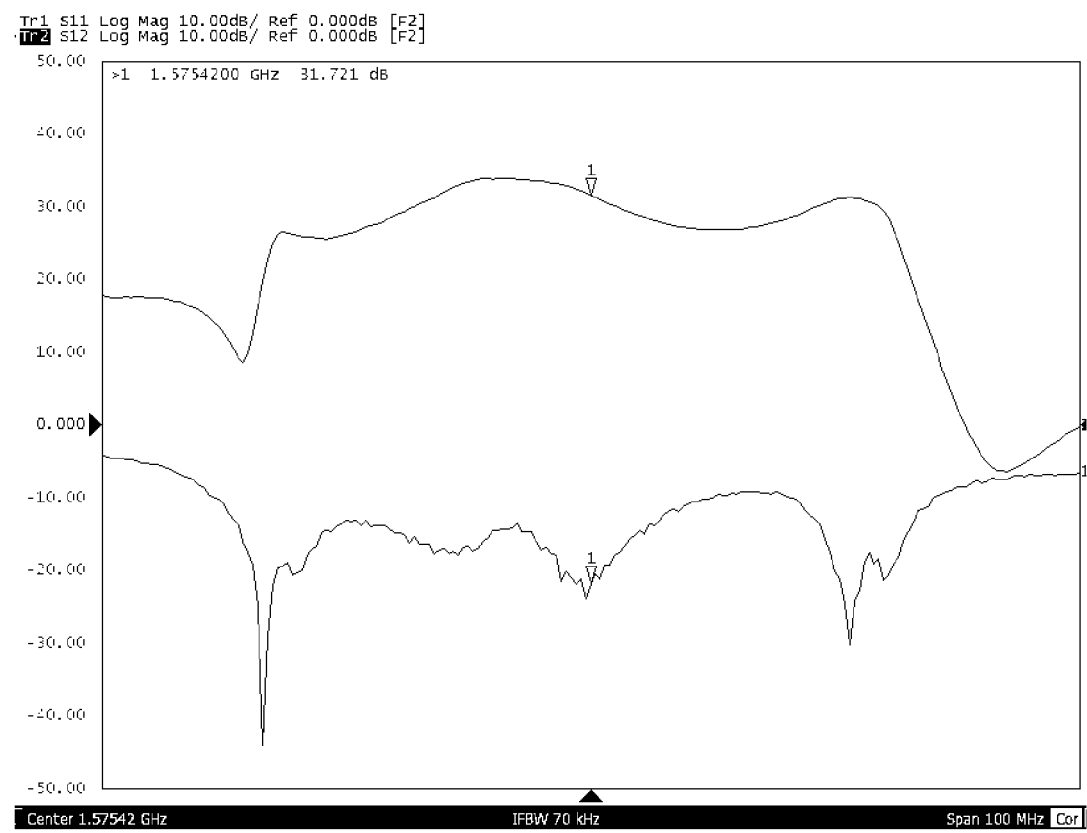
FIG. 4 is a graph of the gain and return loss of the second port when the first port is open.
Figure 5:
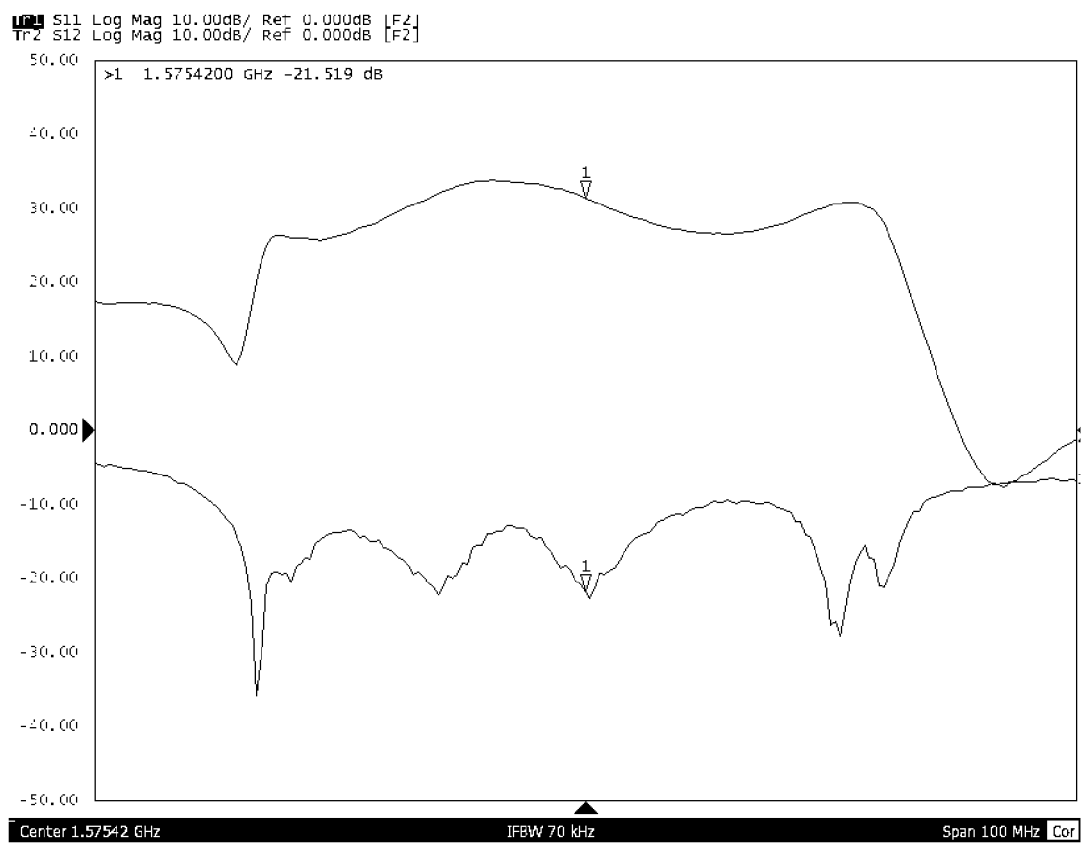
FIG. 5 is a graph of the gain and return loss of the second port when the first port works.

Referring to FIG. 2 to FIG. 5 and comparing FIG. 2 and FIG. 3, the gain of the amplifier is substantially consistent with the efficiency thereof. Similarly, comparing FIG. 4 and FIG. 5, it can be seen that the gain and efficiency of the amplifier remain basically unchanged. This illustrates that the two ports are independent to each other, in which a failure of one port does not affect the work of the other port.

The basic principles, main features and the advantages of the present disclosure have been shown and described above. It would be appreciated by those skilled in the art that the above embodiments cannot be construed to limit the present disclosure, and the above embodiments and the description in the specification are only for the purpose of illustrating the principle of the present disclosure. Changes and modifications which fall within the claimed scope of the disclosure can be made in the embodiments without departing from spirit and scope of the present disclosure. The protection scope of the present disclosure is defined by the appended claims and equivalents thereof.

What is claimed is:

1. A GPS/Beidou onboard antenna with a dual output port low noise amplifier, comprising: an antenna, an amplifier chip, a power divider, a first radio frequency switch, a second radio frequency switch, a first direct-current bias, a second direct-current bias, a first port, a second port, and a voltage selection circuit, characterized in that the antenna transmits a received radio frequency signal amplified by the amplified chip, which is connected to the antenna, to the power divider connected to the amplified chip; the radio frequency signal is divided by the power divider to be transmitted in two signal paths, in one of which the radio frequency signal goes through the first radio frequency switch, the first direct-current bias and the first port so as to be output to a receiver connected, and in the other of which the radio frequency signal goes through the second radio frequency switch, the second direct-current bias and the second port so as to be output to another receiver connected; the first radio frequency switch and the second radio frequency switch are each connected to a matching load; the voltage selection circuit, which is connected to the first direct-current bias and to the second direct-current bias, respectively, compares two direct-current voltages from the first port and the second port, and outputs the higher direct-current voltage thereof so as to supply power to the first radio frequency switch, the second radio frequency switch, the power divider and the amplifier chip; the first direct-current bias sends a control signal to connect the first radio frequency switch to the matching load when the first port is open or disconnected; the second direct-current bias sends a control signal to connect the second radio frequency switch to the matching load when the second port is open or disconnected.

2. The GPS/Beidou onboard antenna with a dual output port low noise amplifier according to claim 1, characterized in that the antenna is a microstrip antenna with a ceramic dielectric.

3. The GPS/Beidou onboard antenna with a dual output port low noise amplifier according to claim 1, characterized in that Maxim MAX2670 is used as the amplifier chip.

4. The GPS/Beidou onboard antenna with a dual output port low noise amplifier as claimed in claim 1, characterized in that a Wilkinson microstrip type power divider is used as the power divider.

5. The GPS/Beidou onboard antenna with a dual output port low noise amplifier as claimed in claim 1, characterized in that an Infineon single pole double throw radio frequency switch chip BGS12AL74 is selected for the first radio frequency switch and the second radio frequency switch.

6. The GPS/Beidou onboard antenna with a dual output port low noise amplifier as claimed in claim 1, characterized in that the first direct-current bias and the second direct-current bias consist of an inductor and a capacitor, respectively.

7. The GPS/Beidou onboard antenna with a dual output port low noise amplifier according to claim 1, characterized in that the voltage selection circuit consists of two diodes.

8. The GPS/Beidou onboard antenna with a dual output port low noise amplifier according to claim 1, characterized in that the matching load is a 50 ohm resistor.

9. The GPS/Beidou onboard antenna with a dual output port low noise amplifier according to claim 1, characterized in that the direct-current voltage range is 3 to 6 volts.

\* \* \* \* \*